(12) United States Patent
Toto

(10) Patent No.: US 7,647,725 B2
(45) Date of Patent: Jan. 19, 2010

(54) OZONE TREATMENT OF MUSHROOM HOUSE

(76) Inventor: Remo Toto, 2071 Oxford Rd., Lincoln University, PA (US) 19352

( * ) Notice: Subject to any disclaimer, the term of this patent is extended or adjusted under 35 U.S.C. 154(b) by 0 days.

(21) Appl. No.: 12/116,287

(22) Filed: May 7, 2008

(65) Prior Publication Data

US 2008/0256853 A1 Oct. 23, 2008

Related U.S. Application Data

(63) Continuation-in-part of application No. 11/320,279, filed on Dec. 28, 2005, now Pat. No. 7,383,661.

(51) Int. Cl.
*A01G 1/04* (2006.01)
(52) U.S. Cl. ........................................................ 47/1.1
(58) Field of Classification Search .................... 47/1.1, 47/17, 60; 422/186.07
See application file for complete search history.

(56) References Cited

U.S. PATENT DOCUMENTS

| | | | | |
|---|---|---|---|---|
| 1,773,648 A | * | 8/1930 | Steves | 47/1.1 |
| 3,242,614 A | * | 3/1966 | Thompson | 47/1.1 |
| 3,810,327 A | * | 5/1974 | Giansante | 47/1.1 |
| 4,267,664 A | * | 5/1981 | Henke | 47/1.1 |
| 5,097,623 A | * | 3/1992 | Furuya et al. | 47/1.1 |
| 5,503,647 A | | 4/1996 | Dahlberg | |
| 5,935,431 A | | 8/1999 | Koria | |
| 6,018,906 A | | 2/2000 | Pia | |
| 6,073,388 A | | 6/2000 | Kananen | |
| 6,426,053 B1 | | 7/2002 | Barnes | |
| 6,748,696 B1 | * | 6/2004 | Davidson | 47/1.1 |
| 6,951,633 B1 | | 10/2005 | Barnes | |
| 2004/0082479 A1 | | 4/2004 | Mirelman | |
| 2005/0066537 A1 | | 3/2005 | Kahner | |

FOREIGN PATENT DOCUMENTS

| | | |
|---|---|---|
| JP | 402084113 | 3/1990 |
| JP | 408047335 | 2/1996 |
| KR | 2005114763 | 12/2005 |

* cited by examiner

*Primary Examiner*—T. Nguyen
(74) *Attorney, Agent, or Firm*—Connolly Bove Lodge & Hutz

(57) ABSTRACT

Ozone is applied to the interior of a mushroom house through use of an ozone generator which preferably communicates with an air conditioner so that the ozone flows from the ozone generator through the air conditioner and into the mushroom house. The ozone is applied during various stages of a mushroom growing process.

9 Claims, 3 Drawing Sheets

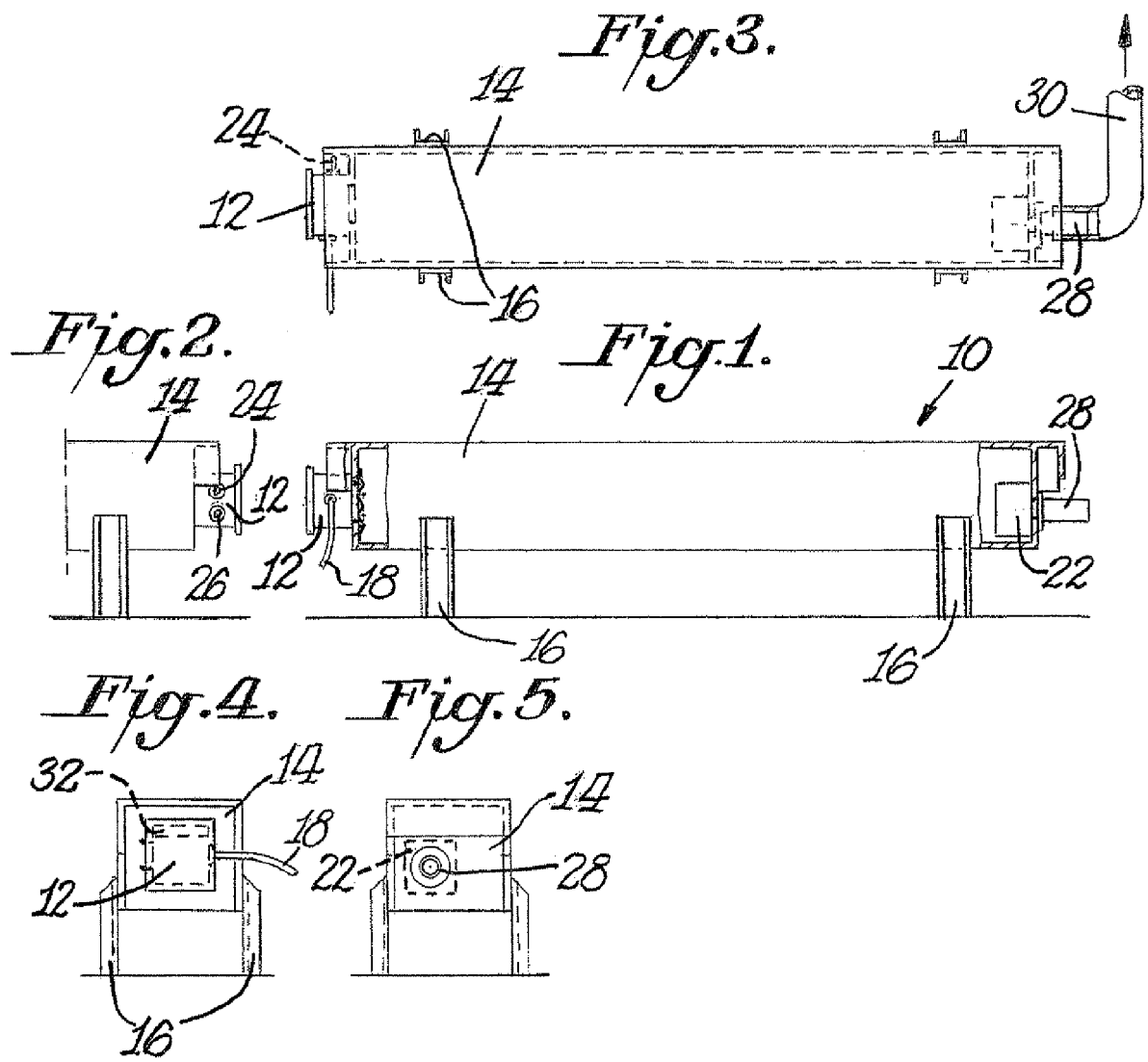

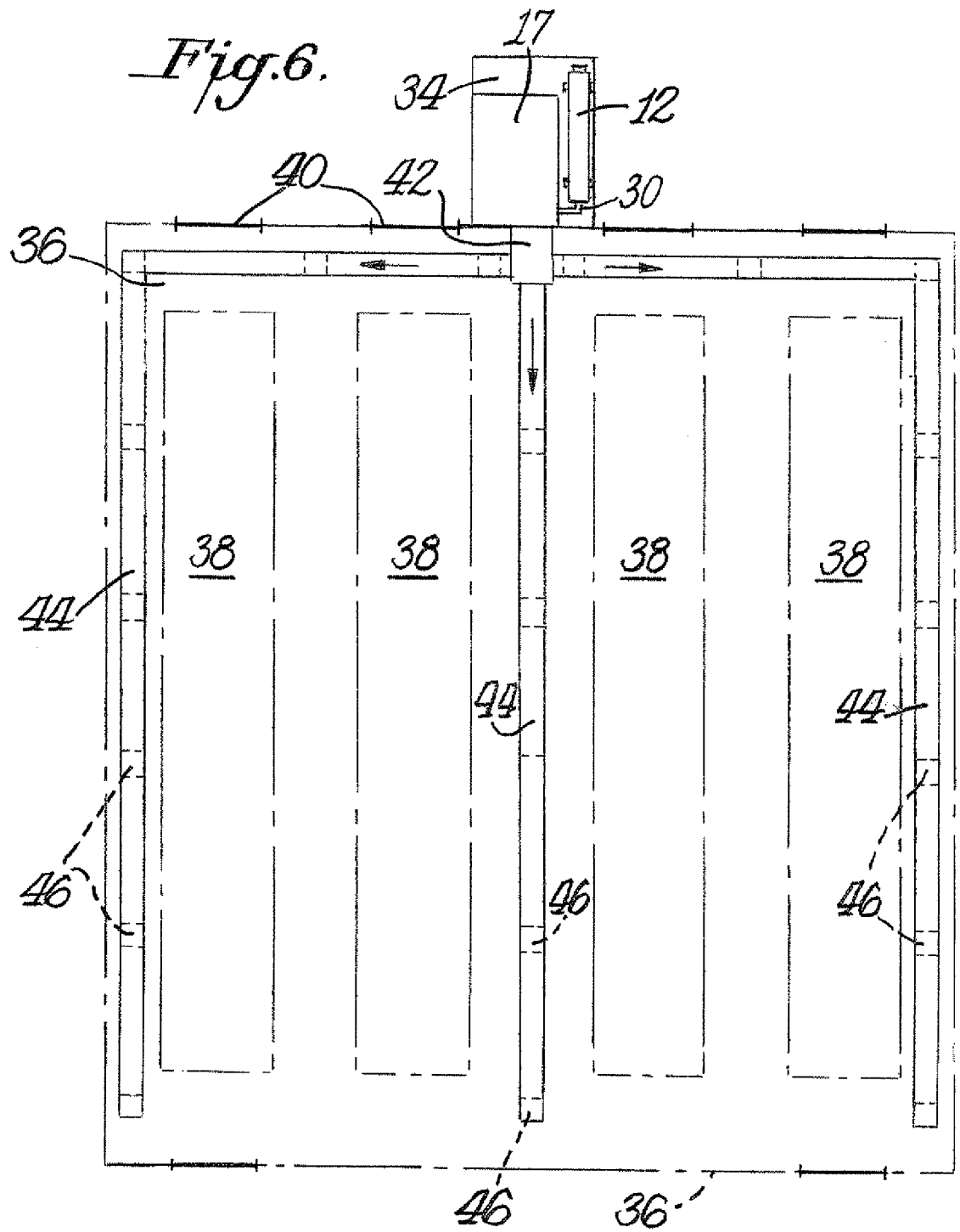

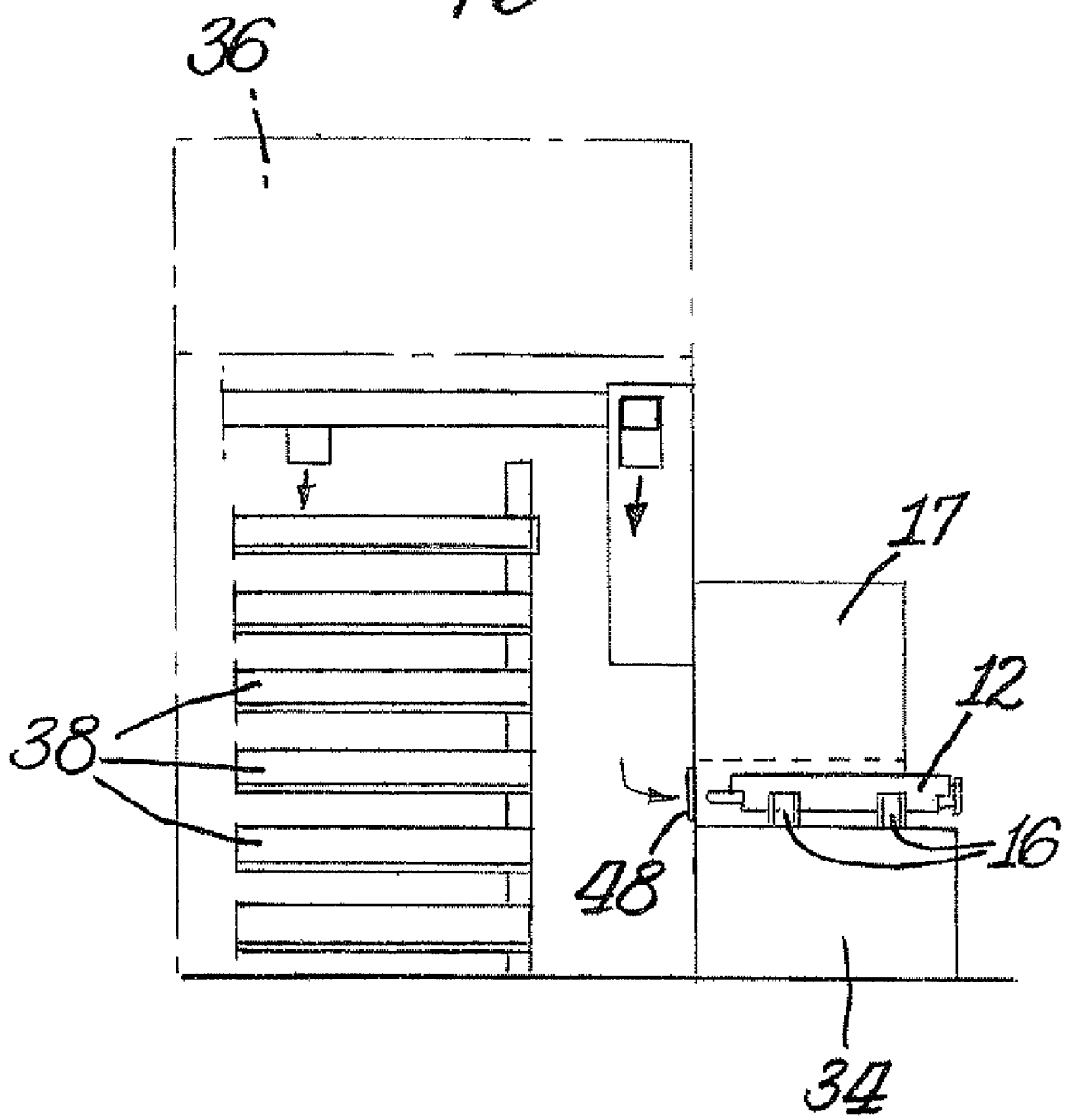

OZONE TREATMENT OF MUSHROOM HOUSE

CROSS-REFERENCE TO RELATED APPLICATION

This application is a continuation-in-part of application Ser. No. 11/320,279 filed Dec. 28, 2005, now U.S. Pat. No. 7,383,661 all of the details of which are incorporated herein by reference thereto.

BACKGROUND OF THE INVENTION

The growing of mushrooms is done under controlled conditions for a lengthy period of time. Various standard techniques are known. Some of these techniques are described in U.S. Pat. No. 6,018,906, all of the details of which are incorporated herein by reference thereto. As pointed out, two common techniques for mushroom cultivation are in the use of mushroom beds or shelves and in a tray system. Other methods of growing mushrooms have been the bag system, the ridge bed system and deep trough system. These systems, particularly the bed and the tray systems include two distinct phases. Phase I is generally done outdoors and involves composting the material to be used for cultivating the mushrooms. The compost is then conveyed into a mushroom house and fills the receptacles, such as beds or trays. In general, the compost is then heated to pasteurize the compost and ensure that the compost is free from most mushroom pests and diseases. The pasteurized compost then undergoes a cool down procedure. The pasteurizing step could take up to 14 days and the cool down procedure could take about 3 days. The next operation is the spawning where the compost is inoculated with mushroom mycelia by distributing particulate material colonized with mushroom mycelia (spawn) through the compost. The spawning run might take about 14 to 16 days. Next the colonized compost is covered by a layer of nutrient poor material or casing. The casing layer holds the moisture so that the mycelium must grow through the casing layer. The next step might be considered a flash step which occurs about twenty days after the mycelium breaks through the casing layer. The flash step is the first picking of cultivated mushrooms. Finally, after the mushroom heads break through the casing layer there is a final harvesting of the mushrooms. Reference is also had to U.S. Pat. Nos. 6,073,388 and 5,503,647, all of the details of which are incorporated herein with regard to mushroom growing techniques.

In order to provide the best form of cultivated mushrooms under these controlled conditions it would be desirable if there were some assurance of having the mushroom house in a sterilized condition to prevent outside contamination interfering with the mushroom growth. It has been known in other fields to use ozone as a means of sterilization. The use of ozone in connection with the growing of mushrooms, however, has not heretofore been contemplated. One reason, perhaps is that ozone might be considered to create detrimental aesthetic and health affects if the ozone contacts the mushrooms.

Parent application Ser. No. 11/320,279 discloses providing ozone treatment to a mushroom house by having an ozone generator assembly communicating with ozone distributing structure located within the house or enclosure to feed the ozone into the enclosure and around the mushroom growing receptacles in the enclosure. As disclosed in that application the ozone generator assembly is located externally of the enclosure while the ozone distributing structure within the enclosure communicates with an inlet in the wall of the enclosure and has spaced discharged outlets. The ozone distributing structure also includes a hose within the enclosure mounted at the inlet and communicating with a plenum in the enclosure. The plenum has a heat pump and a blower to facilitate feeding the ozone into a manifold having spaced discharged outlets at spaced locations within the enclosure.

Korean patent KR2005114763A appears to disclose a structure for sterilizing the mushroom culture itself through the use of various materials including ozone which are applied directly into the mushroom culture. As illustrated in that Korean patent an ozone generator communicates with a pipeline having supply pipes that penetrate into seal grooves and the culture containers. In this manner the ozone is supplied directly into the culture containers to penetrate into the culture medium. The drawing apparently also illustrates a reduction catalyst supply, an oxygen generator, a humidifier, an air conditioner and a vacuum pump which are all constructed as part of a single circulating circuit with the ozone generator to connect the pipeline in the control chamber with the pipeline and discharge the material flowing therethrough to go directly into the culture medium. The intent is apparently to treat the spawn whereby not only ozone, but also, for example, a catalyst and oxygen are applied directly into the culture. This disclosure differs significantly from the techniques described in the parent application Ser. No. 11/320,279. In that regard, in the parent application the ozone is fed directly into the general atmosphere in the interior of and throughout the mushroom house since it is the interior of the house which is intended to be sterilized. In contrast with the Korean patent, the ozone is intended to sterilize the culture medium itself and in all likelihood would not be of sufficient quantity to flow through and exit from the culture medium to have any significant sterilizing affect on the atmosphere in the interior of the mushroom house or enclosure.

SUMMARY OF THE INVENTION

An object of this invention is to provide a mushroom house with an ozone generator system for sterilizing the interior of a mushroom house.

In accordance with this invention the ozone treatment system may include an ozone generator assembly that could be mounted externally of the house. Ozone distributing structure communicates with the ozone generator assembly and discharges the ozone within the enclosure at locations spaced from the mushroom growing receptacles in the enclosure so that the ozone freely flows throughout the atmosphere in the interior of the enclosure.

In a preferred practice of this invention the ozone generator is mounted in communication with an air conditioner which could be of otherwise conventional construction. The ozone is then fed from the air conditioner through a distributing system within the enclosure.

In a preferred practice of this invention the ozone distributing system is located near the top of the interior of the enclosure above the mushroom beds and the ozone is directed to flow freely throughout the interior of the house.

THE DRAWINGS

FIG. 1 is a right side elevational view partly broken away of an ozone treatment assembly in a system for a mushroom house in accordance with this invention;

FIG. 2 is a left side elevational view partly broken away of the assembly shown in FIG. 1;

FIG. 3 is a top plan view of the assembly shown in FIGS. 1-2;

FIGS. 4-5 are end elevational views of the assembly shown in FIGS. 1-3;

FIG. 6 is a schematic top plan view of a mushroom house which includes the ozone treatment system of FIGS. 1-5; and FIG. 7 is a side elevational view of the mushroom house shown in FIG. 6.

DETAILED DESCRIPTION

Parent application Ser. No. 11/320,279 discloses an ozone treatment system for mushroom houses which can operate in effect for providing a shock treatment to clean the interior of the mushroom house. The present invention utilizes modifications of that system which could be used in addition to or instead of the larger unit described in that application.

As shown in FIGS. 1-7 the system 10 includes an ozone generator 12 mounted to and in communication with an air conditioner unit 17. See FIGS. 6-7. The air conditioner 17 could be of any suitable conventional construction. Ozone generator 12 could be mounted outside the mushroom house by being mounted on legs or supports 16. Any suitable ozone generator could be used for ozone generator 12. For example, the ozone generator 12 could be powered from electrical wiring 18 which would plug into a conventional 110 socket. The ozone would flow through filter screen 20 into the interior or plenum 14. The outlet end of plenum 14 is provided with a blower 22 to provide suction of the ozone through the plenum and into the air conditioner 17. If desired, the ozone generator 12 and also the air conditioner 17 could be covered with a suitable protective covering such as a plastic tube being mounted over the ozone generator 12 and/or air condition 17 to shield them from water or other elements.

Ozone generator 12 is provided with an upper switch 24 and a lower switch 26. Each switch controls an amount of ozone produced by generator 12. For example, each switch could permit 50% of the ozone to be produced. Thus, when both switches are turned on there would be full or 100% ozone produced in generator 12. Having only one switch activated reduces the amount of ozone in half. If desired, other switches and/or other proportions could be used.

The ozone from ozone generator 12 proceeds through filter 20 into plenum 14 and then flows into air conditioner 17 through connector pipe 28, which communicates with a hose 30 mounted over pipe 28 and then communicates with air conditioner 17.

As shown in FIG. 7 air conditioner 17 is mounted in an elevated position on platform or pier 34. Ozone generator 12 is also mounted on platform 34 with its legs 16 being placed directly on the platform. Ozone generator 12 is of sufficiently small size that it is portable.

The ozone created in ozone generator 12 passes through screen 20 into plenum 14 under the influence of blower 22. The ozone then exits through pipe 28 into connecting hose 30 which leads to and communicates with air conditioner 17.

As shown in FIG. 4 ozone generator 12 also includes any suitable timer 32 which controls the operation of the ozone generator for preset periods of time and which could include controlling which of the switches 24 and 26 are actuated. In addition or alternatively switches 26 and 28 could be manually actuated. The use of a timer 32 permits control over a pattern in both terms of time and quantity of the ozone that is ultimately supplied through outlet tube 28 and into connector hose 30.

FIGS. 6-7 show a mushroom house 36 which would be treated by the ozone. House or enclosure 36 would be of generally conventional construction except as regards accommodating the ozone treatment system 10. In that regard, house 36 would have a plurality of walls including an upper wall and would have a generally open interior. Mounted within the house or enclosure 36 is a plurality of sets of conventional vertically stacked mushroom beds 38. It is to be understood, however, that any other arrangement of mushroom beds could be used in house 36.

The vertical walls of mushroom house 36 could include access doors 40 located at each column of mushroom beds to provide access to the beds.

The air conditioner outlet communicates with an inlet unit 42 in one of the walls of enclosure 36. Inlet unit 42 functions as a manifold to supply the ozone through distributing pipes 44. These pipes 44 are preferably located above the mushroom beds and spaced from the mushroom beds so that the ozone discharged through outlets 46 flow freely into the open atmosphere spaced from and out of contact with the mushroom beds or the material in the beds. In this manner, the ozone flows freely throughout the interior of mushroom house 36 to achieve its sterilization of the interior.

As the ozone enters the interior of mushroom house or enclosure 36 the air it displaces is returned through air conditioner inlet 48.

FIG. 6 illustrates manifold 42 to supply ozone through three distribution lines. One of these lines extends directly across the center of the mushroom house or enclosure 36. The other two lines extend first transversely and then make a right angle turn parallel to the central distribution line. It is to be understood, however, that this arrangement of distribution lines is merely for exemplary purposes.

The following is an example in the use of the ozone treatment system of this invention. In this example compost would be provided in each mushroom bed which would be about 8-10 inches deep. Each mushroom bed would be covered with plastic to hold in the moisture and prevent contamination. The timer 32 would then be set for supplying ozone into the interior of house 36 for a period of 12 hours. By actuating both upper and lower switches 24,26 100% ozone could be supplied. Where only 50% ozone is desired top switch 42 would be actuated since top switch 42 also controls the blower 22. Bottom switch 26 would not be actuated thereby resulting in a flow of only 50% ozone. Next, the ozone generator would be run off and on for 12 hour periods a day for 16 days. Preferably, the on/off times would start at 3 o'clock. Peat moss would be put on the beds preferably 1¾ inches thick. Next, mycelium would be spread evenly over the peat moss. When mushroom heads appear which are about the size of a pencil eraser the bottom switch 26 is turned off and only the top switch would be actuated thereby supplying only 50% ozone with the blower running. At this stage of the process, 100% ozone is not desired since it might turn the mushroom color brown.

After three days the mushrooms are ready to be picked or harvested by pulling the head, stem and root. This is followed by a flush with the ozone generator. Next, the dormant pea sized mushrooms will grow and would be pulled after three days followed by a second ozone flush. The prior step could be repeated in three days followed by a third ozone flush. By having periods of time where the ozone generator is off the pickers may pick the mushrooms during the down time. In general, six to eight hours a day are spent picking mushrooms.

Among the advantages in the use of the ozone treatment system of this invention is that there is a speed up in the production of the mushrooms by shortening the mushroom time, for example, from 30 days to 25 days. The use of a third flush with ozone produces a better quality mushroom having less disease and contamination. The better quality mushroom makes a better crop. The multiple flushes act to address problems that might be caused by flies, for example, coming into the mushroom house when the doors are opened and closed and by other contamination coming in through the doors and/or from the workers having contamination on their clothing. The shortened production period of 25 days allows for more time to clean the beds and do any repairs and also permits starting the subsequent crop earlier.

It is to be understood that the above description is exemplary of the preferred manner of practicing the invention. The concepts of the invention, however, regarding the use of ozone to sterilize the interior of a mushroom house and the multiple flushes at various stages in the mushroom growing process may be practiced with variations in times and amounts of ozone application. In general, one aspect of this invention is that ozone is applied in on/off sequences over extended periods of time during multiple phases of the mushroom growing steps. For example, the ozone would be applied after the compost is pasturized. Such application would take place over an extended period of time such as 12 hours, using a full 100% ozone supply. This alternating application of ozone would take place for each day until the mycelium is spread onto the peat moss. Then, when the mushroom heads begin to appear a reduced amount of ozone, such as 50% application of ozone, would be applied during extended on and off times until the mushrooms are ready to be picked. When dormant mushrooms again begin to emerge a further flush with ozone is repeated for a number of days, such as three days, and this is repeated for each subsequent harvesting. Thus, for example, the ozone is applied after the compost is pasturized. The ozone is applied after spawning. The ozone is applied after casing and the ozone is applied after each harvesting.

What is claimed is:

1. A mushroom house comprising an enclosure, at least one mushroom growing receptacle in said enclosure, an ozone generator assembly, ozone distributing structure communicating with said ozone generator assembly, said ozone distributing structure being located within said enclosure and having ozone discharge outlets, and said ozone discharge outlets being spaced from and out of contact with said at least one receptacle to feed ozone into said enclosure by flowing freely through the atmosphere within said enclosure before contacting said at least one receptacle, and wherein said ozone generator assembly is mounted to and in communication with an air conditioner, and said air conditioner communicating with said ozone distributor structure for feeding ozone from said ozone generator assembly and through said air conditioner and then into said ozone distributing structure.

2. The mushroom house of claim 1 wherein said ozone generator assembly is located externally of said enclosure, an inlet in a wall of said enclosure, said ozone distributing structure including a hose between said ozone generator assembly and said inlet, and an air outlet in said enclosure for discharging air from said enclosure.

3. The mushroom house of claim 1 wherein said ozone distributing structure includes a timer for setting the period of time of operation of ozone production by said ozone generator assembly.

4. The mushroom house of claim 3 wherein said ozone distributor assembly includes switch controls for controlling the amount of ozone produced by said ozone distributor assembly.

5. The mushroom house of claim 1 wherein said enclosure includes an air inlet for discharging air from said enclosure into said air conditioner through an air inlet.

6. The mushroom house of claim 1 wherein said ozone distributing structure includes a timer for setting the period of time of operation of said ozone generator assembly.

7. The mushroom house of claim 5 wherein said ozone distributor assembly includes switch controls for controlling the amount of ozone produced by said ozone distributor assembly.

8. The mushroom house of claim 1 wherein said discharge outlets are located in a top portion of said mushroom house at a location vertically above said at least one receptacle.

9. The mushroom house of claim 8 wherein said at least one receptacle comprises a plurality of receptacles mounted in sets of multi-tiered vertical beds, and including mushroom compost in said at least one receptacle.

* * * * *